United States Patent [19]
Apfel

[11] Patent Number: 5,746,448
[45] Date of Patent: May 5, 1998

[54] SEAT BELT HOLDER

[76] Inventor: Leonie Apfel, 34 Sandhill Oval, Alwoodley, Leeds LS17, United Kingdom

[21] Appl. No.: 695,489

[22] Filed: Aug. 13, 1996

[30] Foreign Application Priority Data

Aug. 15, 1995 [GB] United Kingdom ............... 9516693

[51] Int. Cl.$^6$ ................ B60R 22/00; B60R 22/48
[52] U.S. Cl. ..................... 280/801.1; 280/807
[58] Field of Search .................... 280/801.1, 807, 280/808

[56] References Cited

U.S. PATENT DOCUMENTS

| | | |
|---|---|---|
| 4,451,087 | 5/1984 | Tamamushi ............... 280/801.1 |
| 4,611,854 | 9/1986 | Pfeiffer ..................... 280/801.1 |
| 4,928,992 | 5/1990 | Qvint et al. ............... 280/801.1 |
| 5,064,220 | 11/1991 | Ogawa ..................... 280/801.1 |
| 5,076,608 | 12/1991 | Shimose ................... 280/801.1 |
| 5,236,220 | 8/1993 | Mills ........................ 280/801.1 |

*Primary Examiner*—Kenneth R. Rice
*Attorney, Agent, or Firm*—Kirkpatrick & Lockhart LLP

[57] ABSTRACT

The invention discloses a seat belt holder for releasably holding a seat belt buckle for a vehicle seat belt in an accessible position when not in use. The holder consists of a body 40, possibly a stabilising fin 41, and an elongated member 43 for retaining the buckle. The holder is attached to the side of the car seat.

12 Claims, 4 Drawing Sheets

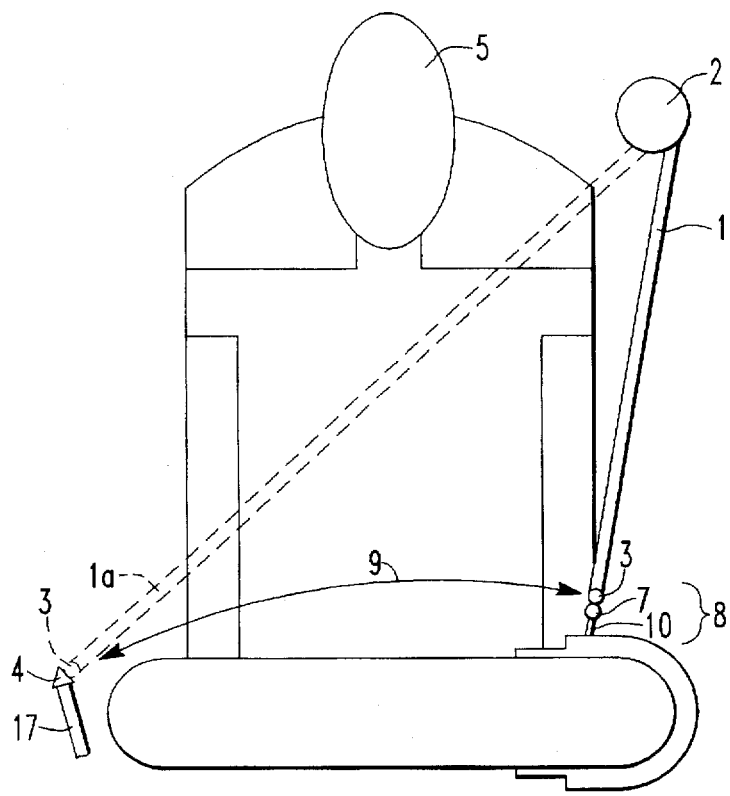
*FIG. 1*
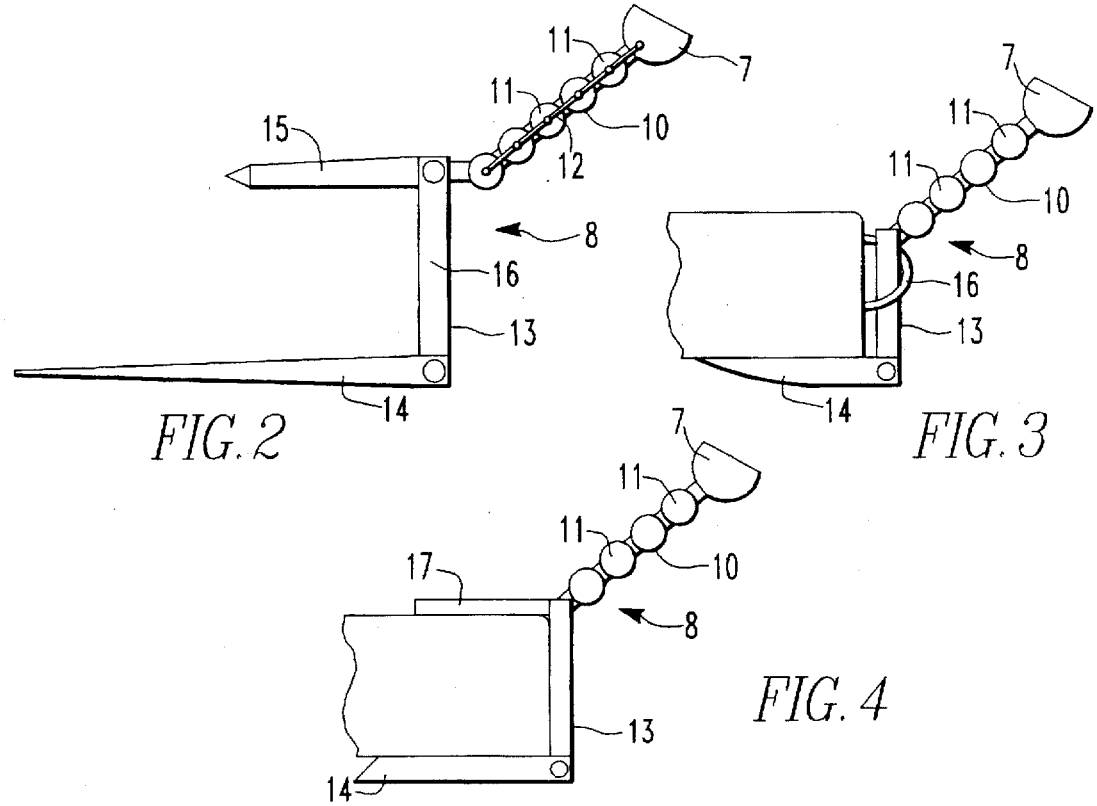
*FIG. 2*
*FIG. 3*
*FIG. 4*

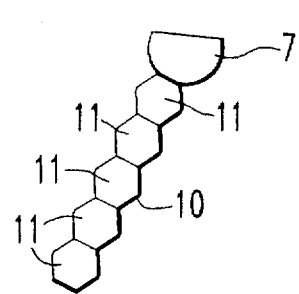
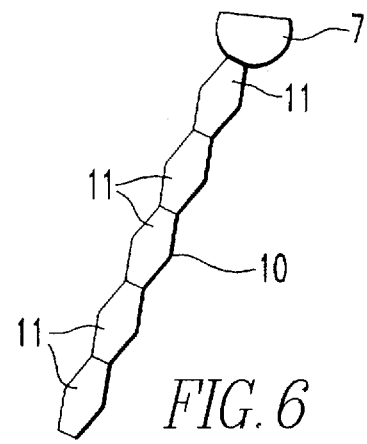
FIG. 5   FIG. 6
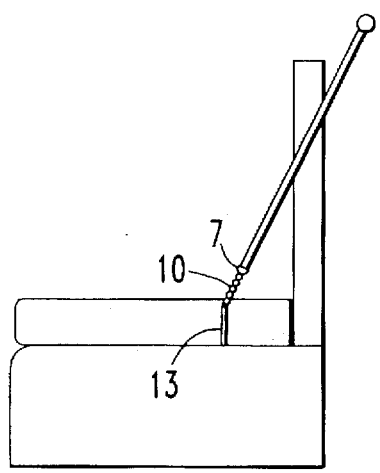
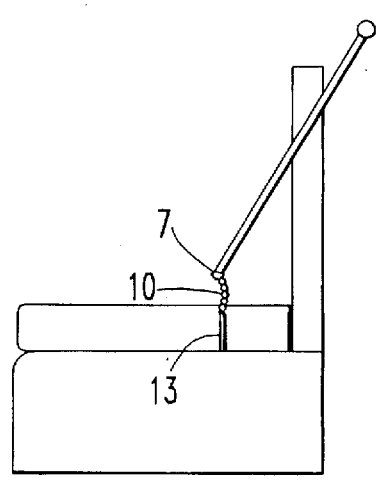
FIG. 7   FIG. 8

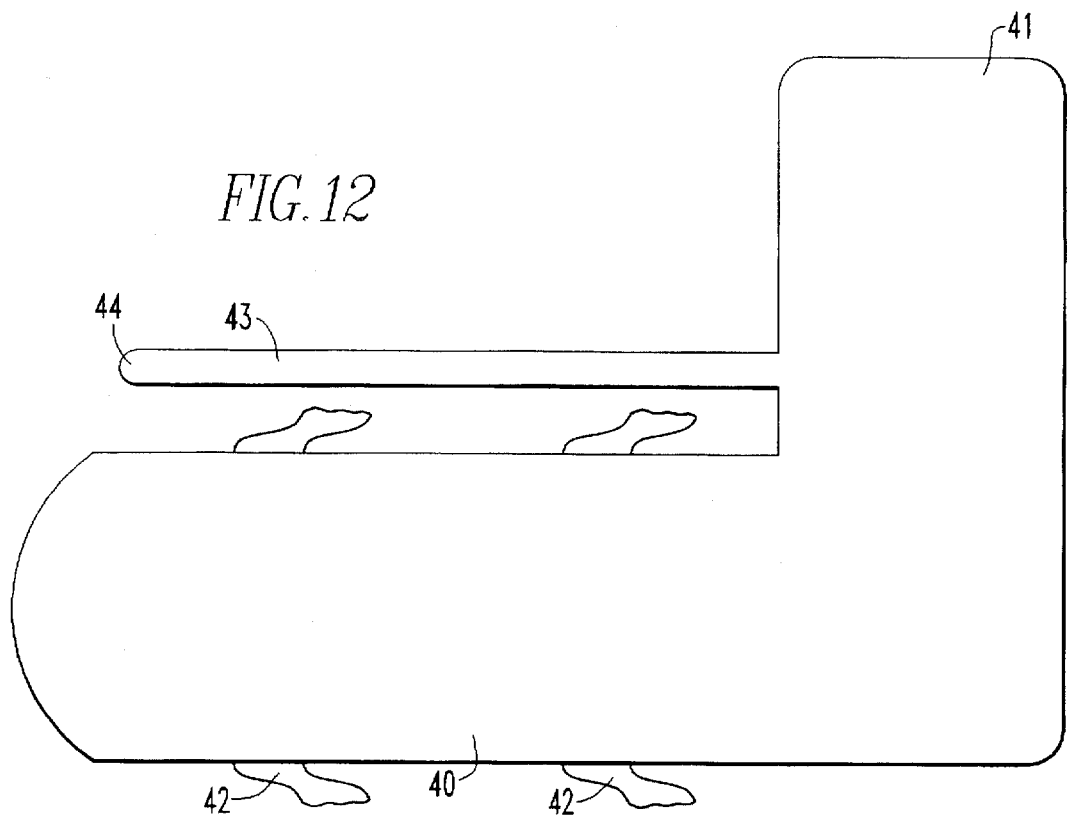
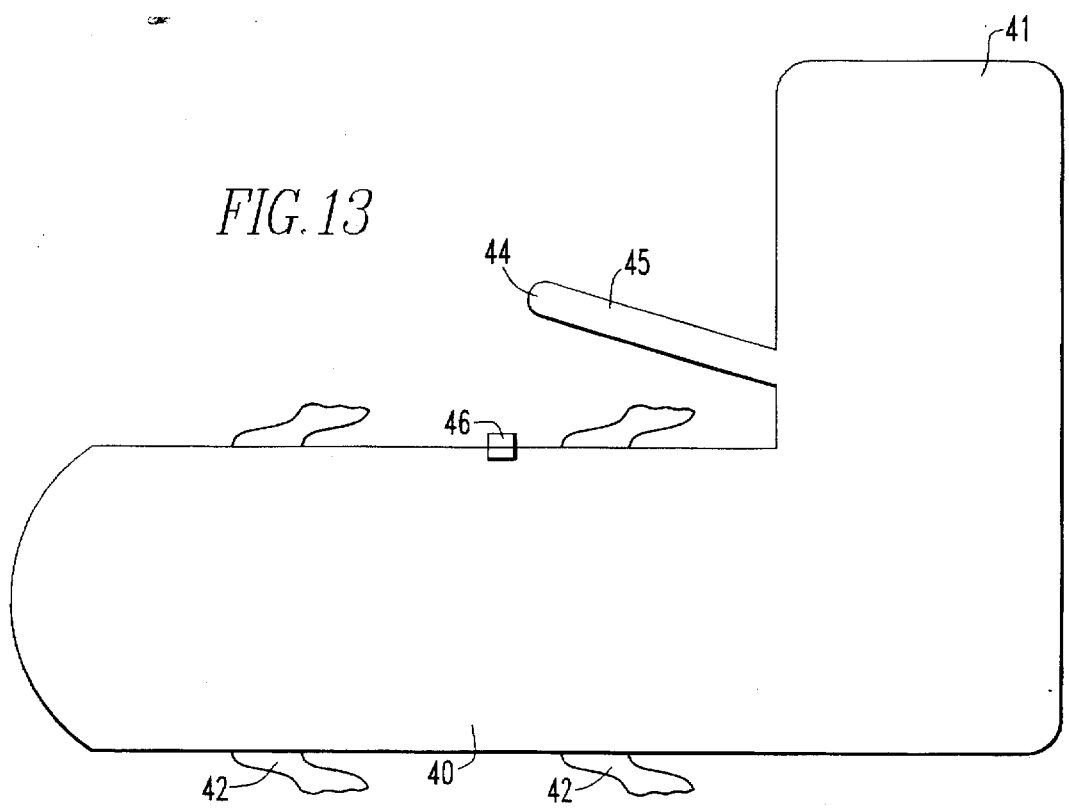

5,746,448

SEAT BELT HOLDER

BACKGROUND OF THE INVENTION

The present invention relates to seat belt assemblies in vehicles and more particularly to a means for holding a seat belt ready for use.

In general, seat belt assemblies in vehicles comprises an inertia wheel and a pulley or hanger. The seat belt itself is wound around the wheel and extends over the pulley or through a slit in the hanger. The end of the belt over the pulley etc has a buckle which the vehicle occupant takes hold of and pulls downwards and across himself to attach to a clip to provide a safety restraint. When he leaves the vehicle the buckle is removed from the clip and, because of the inertia wheel the buckle is pulled back towards the pulley which is normally located slightly behind the occupant just above his upper shoulder on the side of the vehicle. To take hold of the buckle thus requires a twisting movement which is at best awkward and is particularly difficult for elderly people or people with back trouble or pregnant women.

GB 2 138 489 discloses a seat belt holder which allows the buckle to be restrained in an accessible and conspicuous location when not in use by a vehicle occupant. This has a clip arranged to hold the buckle between resilient and magnetic jaws and is mountable to a seat. It may have a hook for engaging behind a seat and a strap extending over the sitting portion to further engage the seat.

A disadvantage with this arrangement is that once the hook or belt has been engaged beneath the seat it becomes very inflexible. It is important that the belt, once attached to the holder, is flexible because it must not interfere with the ability of the occupant to enter and leave the vehicle.

SUMMARY OF THE INVENTION

In accordance with a first aspect of the invention there is provided a seatbelt holder, for releasably holding a buckle of a car seat in a position readily accessible for use, comprising a means for retaining a seat belt buckle, a means for attachment to a seat of a vehicle and an adjustable connection for connecting the means for retaining to the means for attachment.

The adjustable connector allows the seat belt to be moved out of the way when entering and leaving the vehicle or to be held in a more prominent position so that the vehicle occupant does not forget to use it. It enables the holder to be used by people having differing requirements without the attachment means ever having to be repositioned on the seat. It is thus eminently suitable for passenger seats of vehicles used as transport for e.g. hospitals or day centres for the elderly.

The adjustable connector may be flexible.

In one embodiment the means for attachment comprise a bracket having a long lower arm for extending along the underside of the seat and a short upper arm for extending a short distance across the upper side of the seat. The short upper arm is preferably flat so as not to disturb anyone sitting on the seat and its primary purpose is to maintain the stability of the seat belt holder when no belt is attached to it. When the belt is attached it also helps negate any tendency by the belt to pull the holder outwards although normally this in of minor significance. The corners of the bracket are preferably resilient and may be spring loaded in order to grip the seat.

In a variant of this embodiment the attachment means is a single tensioned band of material which is adapted to grip the particular types of seat. Tensioning means may be positioned to pull the band into a semicircular shape to fit the seat. Alternatively, if the band itself is tensioned, for example it is a leaf spring, then separate tensioning means is not necessary. The material of the band may be resilient plastic or metal. At the end of the arms of the band, flat feet may be attached. These may serve to stabilise the band.

As an alternative a protrusion could be purpose built into the seat to which the seat belt holder could be attached. This could be, for example, a loop of material or a metal ring. The attachment means would then consist of an arm for extending along the underside of the seat and a vertical stem to pass through the protrusion. As the ring or loop provides stability for the holding means, the need for an upper arm extending along the seat is removed, thus improving the comfort of the occupant. However it ceases to be possible to use the device on any car seat as not all seats have protrusions attached.

According to a third embodiment the attachment means may comprise a hook or arm for extending along the underside of the seat and a strip of fibrous material having adhesive properties, velcro (TM), for attaching to the upper side of the seat. In this way stability is provided, the comfort of the user is assured and the holder may be used on vehicle seats in general. A strip of fibrous material may likewise be provided on either of the earlier two embodiments.

The adjustable connector connects the means for retaining the belt, which may be a buckle, clip, hook or claw, to the attachment means. It may be made separately from the attachment means and this has the advantage of allowing it to be fitted into a conveniently shaped package for sale. It may comprise a series of solid sections connected end to end in resilient manner. Alternatively it may comprise a series of sections connected together, each section having adjustable dimensions. The advantage of such sections is that the overall length of the connector may be altered as well as the angle.

As a further alternative the sections may be hollow rigid tubes designed to slide over one another so that the adjustable connector is a telescopic arm. The adjustable connector may be attached to the attachment means via a universal joint or any like arrangement which gives angular flexibility.

An embodiment includes an end-piece of the connector which is attached via the said universal joint to the rest of the connector and the end-piece is clipped on to the attachment means.

According to a second aspect of the invention there is provided a seat belt holder, for releasably holding a buckle of a seat belt in a position readily accessible for use, comprising a body, attachment means for attaching the body to a car seat, and an elongated member having a first end attached to the holder and a second, free end, for releasably holding the buckle.

In embodiments the body is flattened to enable it to be held stably against the side of the seat by the attachment means. The body is elongated and the elongated member extends parallel to the lengthwise direction of the body. A stabilising member, such as a fin, may extend from the body.

The attachment means may be velcro (TM) as in previous embodiments.

In use the seat belt buckle can be left at any point along the elongated member, subject only to the convenience of the user.

BRIEF DESCRIPTION OF THE DRAWINGS

FIG. 1 shows a seat belt in use with a device according to the invention. according to the invention.

FIG. 2 shows an embodiment of a device according to the invention with a part shown in cross section.

FIG. 3 shows another embodiment of a device according to the invention.

FIG. 4 shows a third embodiment of a device according to the invention.

FIGS. 5 and 6 show part of a device according to a further embodiment of the invention.

FIGS. 7 and 8 show another part of a device according to an embodiment of the invention.

FIG. 12 shows another device according to the invention.

FIG. 13 shows a variant of the device of FIG. 12.

DESCRIPTION OF THE PREFERRED EMBODIMENTS

Figure 9:
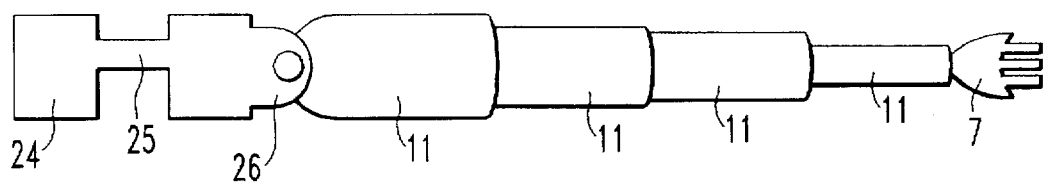
FIGS. 9, 10 and 11 show further embodiments of parts of the device.

FIG. 1 shows a seat belt in use with a device according to the invention. A seat belt 1, 1a extends from a pulley or hanger 2 and has a buckle 3 which is inserted into a clip 4 when the seat belt is required to restrain the occupant 5 in the seat 6. Dashed lines show the belt 1a in its in-use position.

When not in use the belt is removed from the clip 4 to a retaining member 7 which is part of the belt holder 8. This movement across the body, along the arrow 9, is a simple movement which requires no awkward twisting of the body. This "ready to use" position is indicated as 1 in the figure.

In FIG. 9 the retaining member is shown as a three pronged claw. The precise number and configuration of the prongs on the claw will depend on the shape of the seat belt buckle it is intended to retain. For buckles including holes only a single prong would be necessary. The prongs are ideally blunt and angled downwards to avoid scratching.

The retaining member 7 is attached to a flexible holding means 10. The flexible holding means is made of sections or segments 11 resiliently attached to each other so that the angles between the segments may be altered so as to vary the position at which the seat belt 1 is held. The connections are stiff enough to prevent the upwards pull of the belt from altering the position once set. FIGS. 7 and 8 respectively show the belt being held in two different positions without any corresponding adjustment having been made to the position of the seat attachment. Such adjustment would have been necessary in the prior art.

In the embodiments shown in FIGS. 1 to 4 the segments themselves are all rigid and it is only their connections that are adjustable. In FIGS. 2, 3 and 4 an embodiment is shown in which the segments are alternately balls and sockets. This enables them to slide over each other so that the flexible holding means is adjustable in three dimensions.

FIG. 2 shows a cross section of the flexible holding means 10 and this shows how the segments may be connected internally to effect resilience. Small chains or cords 12 may connect the middle of each segment to each other segment two positions away. The reason for using a length of two positions is because this provides both the necessary resilience and the maximum freedom of movement. The cords or chains 12 must be attached very tightly to provide the necessary resilience.

A different arrangement of the flexible holding means is shown in FIGS. 5 and 6. Here the segments 11 are not rigid but are of variable dimensions although fixed volume. They can be squashed into short lengths as in FIG. 5 or stretched as in FIG. 6. Once they have been set to a given shape the shape is retained. The ability of the segments 11 to alter their dimensions allows the angle of the belt holder to be changed as well as its length.

A further embodiment of the holding means is shown in FIG. 9. Here the segments of the holding means are hollow tubular sections that slide into one another to provide a telescopic stem for the retaining means 7.

The seat belt holder of the invention is intended to be attachable to at least the driving or front passenger seat of any vehicle.

To this end an attachment means is provided and several possible embodiments follow. In each case the seat must be held sufficiently firmly to enable the holding means to arrest the seat belt without being pulled away by it but it must not damage the seat. In addition the holding means must remain stable when no seat belt is held.

In FIG. 2 the attachment means is provided by a bracket 13. It has a lower arm 14 for passing below the seat in between the squab, or upholstered cushion on which the occupier sits directly, and the lower part of the seat. This arm provides the reaction against the upward pull of the belt. An upper arm 15 (exaggerated in the diagram), extends for a short distance over the upper side of the seat. It is flat so as to minimise discomfort to the occupant, and short and stabilises the holder. In some vehicles there is no lower part of the seat and in this case the upper arm 15 is almost essential In addition, if the two arms are angled towards each other so as to grip the seat in pincer-like fashion then the slight outward force from the seat belt may be overcome. However, as the force from the seat belt is so nearly vertical this is only a minor consideration. Nonetheless hinges of the two arms of the bracket to the stem 16 are provided and a simple lock and release mechanism allows various angles to be set and held. Alternatively grub screws could be provided to fix the device at the required angle but this solution is not preferred because of the likelihood of intended users of the holder having difficulty in operating it.

An alternative attachment means is shown in FIG. 3. The lower arm 14 and stem 13 are identical but, instead of an upper arm 15 a loop extends from the side of the seat. This arrangement is particularly stable but clearly a loop has to be available on the side of the seat and this is difficult to provide. However an advantage of the invention over prior art systems is that it becomes less important where any such loop is positioned as the clip for the belt is separately adjustable.

A third embodiment of the attachment means is shown in FIG. 4. Once again the stem 13 and lower arm 14 are identical to the FIG. 2 embodiment. However the upper arm is replaced by a strip of velcro 17 to attach the holder to the upper part of the seat. This provides stability and also deals with the outward component of the force from the safety belt 1.

Figure 10:
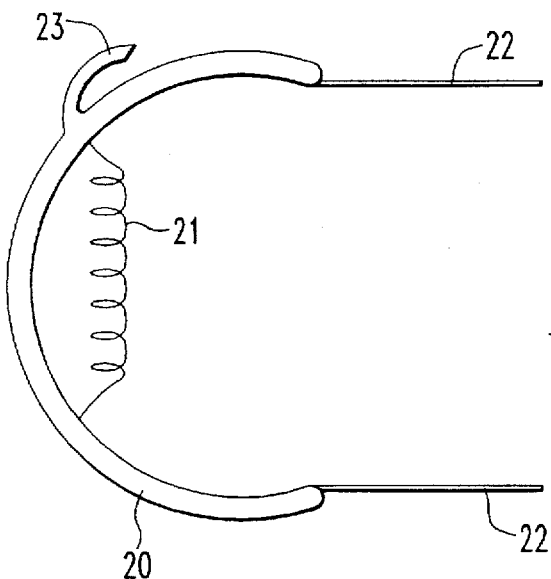

A further embodiment of the attachment means, shown in FIG. 10, consists of a semi-circular band of metal or plastic 20 tensioned by a spring 21 to enable it to grip the seat. The diameter of the band 20 depends on the size of the seat to which it is to be attached. Flat feet 22 may optionally extend from the band 20 to improve stability. The band may be attached either to the base or back of the seat. Strips of fibrous material such as VELCRO (TM) may be attached to the inner surfaces of the band 20 and feet 22 to improve the hold on the seat.

A protrusion 23 extends from the band to form a bracket into which the holding means 10 may be fitted.

The holding means of this embodiment has an end section 24 which has a groove 25 to clip into the gap between the bracket 23 and the band 20. The end section is attached by a universal joint 26 to the first of the segments 11. Thus the holding means is fully flexible in terms of both angle of inclination and length due to the combination of the universal joint and the telescoping ability of the segment.

The retaining means 7 for the belt 1 may, instead of a pronged claw, be a spring-loaded catch and release mechanism and would thus be similar to that 4 of the standard seat belt stem for holding the belt in the in use position. Because the seat belt holder is only intended to hold the belt when not in use and therefore is not subject to safety standards, any other form of clip or hook that will hold the buckle 4, or even the belt itself, is suitable.

Figure 11:
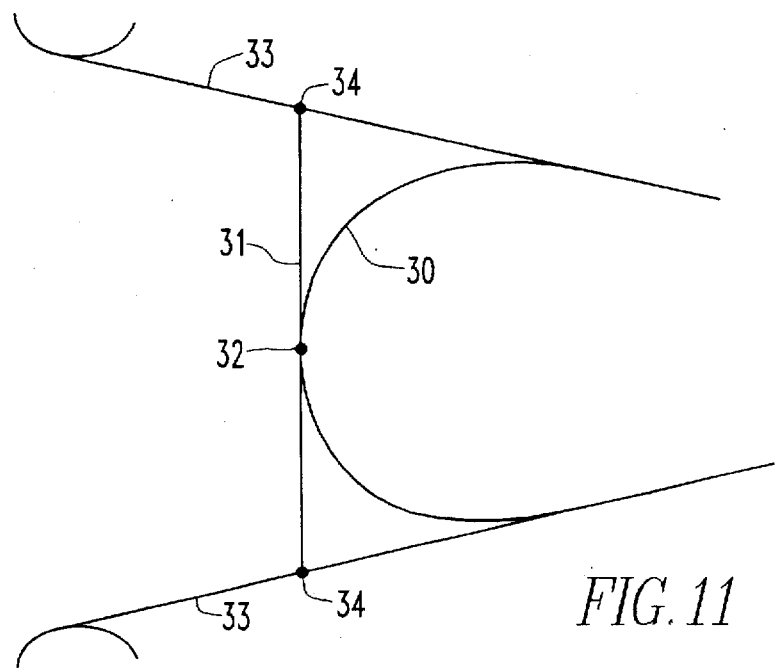

FIG. 11 shows an alternative clip 30 for attaching the retaining means to the seat. There the clip 30 is essentially a leaf spring to the back of which is attached an upright member 31 designed to provide a fulcrum for each of detachable levers 33 that allow the clip to be released. The size and angles of the levers and fulcrum piece are exaggerated for illustrative purposes.

FIG. 12 shows another device according to the invention. The device comprises a flattened body 40 which rests against the side of the seat. A stabilising fin 41 optionally extends upwardly from the body.

Between the flattened body and the fin, sufficient stability is imported to the device to overcome the tendency to roll when held against the seat.

Attachment means 42 are provided to attach the body to the car seat. These may be straps that wrap around the seat cushion and possibly the seat back. They may alternatively be strips of velcro (TM) that extend a sufficient distance around the seat to give the necessary stability to the device.

An elongated member 43 extends from the device body 40 or from the tail fin 41. The elongated member has a rounded end 44 and the buckle of a safety belt is inserted onto the elongated member 44 and left by the user at any point along its length.

In FIG. 12 the elongated member is shown parallel to the lengthwise direction of the body 40 and of substantially the same length. In alternative embodiments the elongated member is shorter than the body 40 and in certain cases can be angled upwards as shown by part 45 in FIG. 13.

The precise dimensions of the body and fin depend on the type of car seat. For example certain types of car seat cannot take a fin. In the basic embodiment the body 40 is flat but it could be moulded to fit the contours of the car seat.

The elongated member 45 may be hinged and a latching mechanism 46 may be provided on the body 40. Following insertion of the belt onto the elongated member 45 the member can then be latched to retain the belt.

I claim:

1. A seat belt holder, for releasably holding a buckle of a seat belt in a position readily accessible for use, comprising a body, attachment means for attaching the body to a car seat, and an elongated member having a first end attached to the holder and a second, free end, for releasably holding the buckle.

2. A holder according to claim 1 wherein the body is elongated so as to have a lengthwise direction, and wherein the elongated member runs substantially parallel to the lengthwise direction of the body.

3. A holder according to claim 1 wherein the body is elongated so as to have a lengthwise direction, and wherein the elongated member is tilted from the lengthwise direction of the body.

4. A device according to claim 1, wherein the free end of the elongated member is rounded.

5. A holder according to claim 1, having a stabilising member fixed in relation to the body.

6. A holder according to claim 5 wherein the stabilising member is a flat fin and the body is flat both thus having two opposing flat surfaces, and wherein the attachment means is adapted to hold one of the flat surfaces of the body stably against a car seat.

7. A seatbelt holder, for releasably holding a buckle of a car seat in a position readily accessible for use, comprising a means for retaining a seat belt buckle, a means for attachment to a seat of a vehicle and an adjustable connection for connecting the means for retaining to the means for attachment.

8. A holder according to claim 7, wherein the attachment means comprises at least one strap.

9. A holder according to claim 8 wherein the at least one strap comprises releasably adhesive fastening tape.

10. A holder according to claim 7 wherein the means for attachment comprises a bracket having a long lower arm for extending along the underside of a seat and a short flat upper arm for extending across the upper side of a seat, wherein the arms are mounted on hinges and wherein the hinges have built-in resilience.

11. A holder according to claim 7, wherein the adjustable connection comprises a series of resilient sections connected together end to end.

12. A holder according to claim 1 wherein the attachment means comprises at least one strap composed of releasably adhesive fastening tape.

* * * * *